(12) United States Patent
Hill, III (10) Patent No.: US 9,778,922 B2
(45) Date of Patent: Oct. 3, 2017

(54) AUTOMATED CODE-GENERATION FOR CROSS-LANGUAGE DEVELOPMENT, TESTING, AND INTEGRATION

(71) Applicant: BAE SYSTEMS Information and Electronic Systems Integration Inc., Nashua, NH (US)

(72) Inventor: Edward H. Hill, III, Brookline, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/925,119

(22) Filed: Oct. 28, 2015

(65) Prior Publication Data

US 2016/0124731 A1    May 5, 2016

Related U.S. Application Data

(60) Provisional application No. 62/073,169, filed on Oct. 31, 2014.

(51) Int. Cl.
*G06F 9/45* (2006.01)
*G06F 9/44* (2006.01)

(52) U.S. Cl.
CPC ............... *G06F 8/51* (2013.01); *G06F 8/31* (2013.01); *G06F 8/47* (2013.01)

(58) Field of Classification Search
CPC ..... G06F 8/30; G06F 8/31; G06F 8/38; G06F 8/40; G06F 8/47; G06F 8/48; G06F 8/51; G06F 8/52; G06F 8/53

USPC ................................. 717/106–109, 135, 137
See application file for complete search history.

(56) References Cited

U.S. PATENT DOCUMENTS

| | | | | |
|---|---|---|---|---|
| 8,572,589 | B2* | 10/2013 | Cataldo | G06F 8/20 717/125 |
| 8,868,786 | B1* | 10/2014 | Kutchmark | H04L 63/0807 709/201 |
| 9,418,085 | B1* | 8/2016 | Shih | G06F 17/30292 707/722 |
| 2013/0066924 | A1* | 3/2013 | Iyer | G06F 8/51 707/802 |

OTHER PUBLICATIONS

Yair Altman, "JSON-Matlab integration", Apr. 2014, retrieved from http://web.archive.org/web/20140416151050/http://undocumentedmatlab.com/blog/jsonmatlabintegration, 4 pages.*

(Continued)

*Primary Examiner* — Ted T Vo
(74) *Attorney, Agent, or Firm* — Vorys, Sater, Seymour and Pease LLP (57) ABSTRACT

A system and method provide for easy sharing of data between different software languages. A method begins by creating a definition defining a data structure with a domain specific language. The definition is then input to a code generator which generates data structures and algorithms in a first software language. The same generator software also creates equivalent data structures and algorithms in a second software language that is different than the first software language. The two output implementations provide compatible utilities for marshalling and de-marshalling data back and forth between the first software language and the second software language without requiring further manipulation of the two implementations.

20 Claims, 7 Drawing Sheets

(56) References Cited

OTHER PUBLICATIONS

MathWorks, "MATLAB Production Server—User Guide", 2013, The MathWorks, Inc., 242 pages.*
MathWorks, "MATLAB—The Language of Technical Computing", 2001, The MathWorks, Inc., 394 pages.*
Dr. Edward H. Hill, III, BAE Systems Inventor Disclosure Document for Rapid Refactoring Via Automated Code Generation, Oct. 31, 2014, Burlington, Massachusetts.

* cited by examiner

AUTOMATED CODE-GENERATION FOR CROSS-LANGUAGE DEVELOPMENT, TESTING, AND INTEGRATION

CROSS REFERENCE TO RELATED APPLICATION

This application claims priority from U.S. Provisional Application Ser. No. 62/073,169, filed Oct. 31, 2014; the disclosure of which is incorporated herein by reference.

FIELD OF THE INVENTION

Various configurations of the current invention relate generally to apparatus, systems, and methods for generating software code. More particularly, the apparatus, systems, and methods relate to automatically generating code from a metalanguage into two or more different software languages. Specifically, the apparatus, systems, and methods provide for generating different software languages that may all share similar code generated input/output classes.

BACKGROUND OF THE INVENTION

Large engineering design projects and/or other systems often require the use of several different types of software, with each software operating on large amounts of data. Similarly, some businesses many generate large amounts of data processed by different software types. For example, signal processing designs such as designs involving radar and advanced signal modulation techniques are initially developed by designers that may use MatLAB software to accurately model the physics of a new design. After designers using MatLAB complete their portion of a design, they provide their results to other designers that may use C++ software to generate code that may later be used real-time in a final product. While designers that use C++ software are proficient at writing efficient C++ code used in the final product, they may not well understand MatLAB software or the physics associated with what they are coding in C++. Additionally, C++ software is very different than MatLAB software. MatLAB input and output data cannot easily be used with C++ input and output data, and vice versa. In general, the C++ software engineer will begin writing his/her code from scratch because C++ commands and data structures are very different than those of MatLAB. Thus, the C++ engineers essentially re-implement what was previously produced in MatLAB nearly from scratch. What is needed is a better way of creating software.

SUMMARY OF THE INVENTION

One embodiment is a method that provides for easy sharing of data between different software languages. A method begins by defining a data structure with a domain specific language. The definition is then input to a code generator which generates data structures and algorithms in a first software language. The same generator software also creates equivalent data structures and algorithms in a second software language that is different than the first software language. The two output implementations provide compatible utilities for marshalling and de-marshalling data back and forth between the first software language and the second software language without requiring further manipulation of the two implementations.

Another configuration is a system that generates software for two or more GPLs as well as utilities to marshal data back and forth between the different software languages. The system includes data structure generation logic and code generation logic. The data structure generation logic provides a way for a user to define a data structure. The code generation logic converts the data structure into a first container of a first software language and converts the data structure to a second container of a second software language that is different than the first software language. The code generation logic also generates utilities that include utilities for marshalling data between the first and second software languages without requiring further formatting of the data.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION OF THE DRAWINGS

Figure 1:
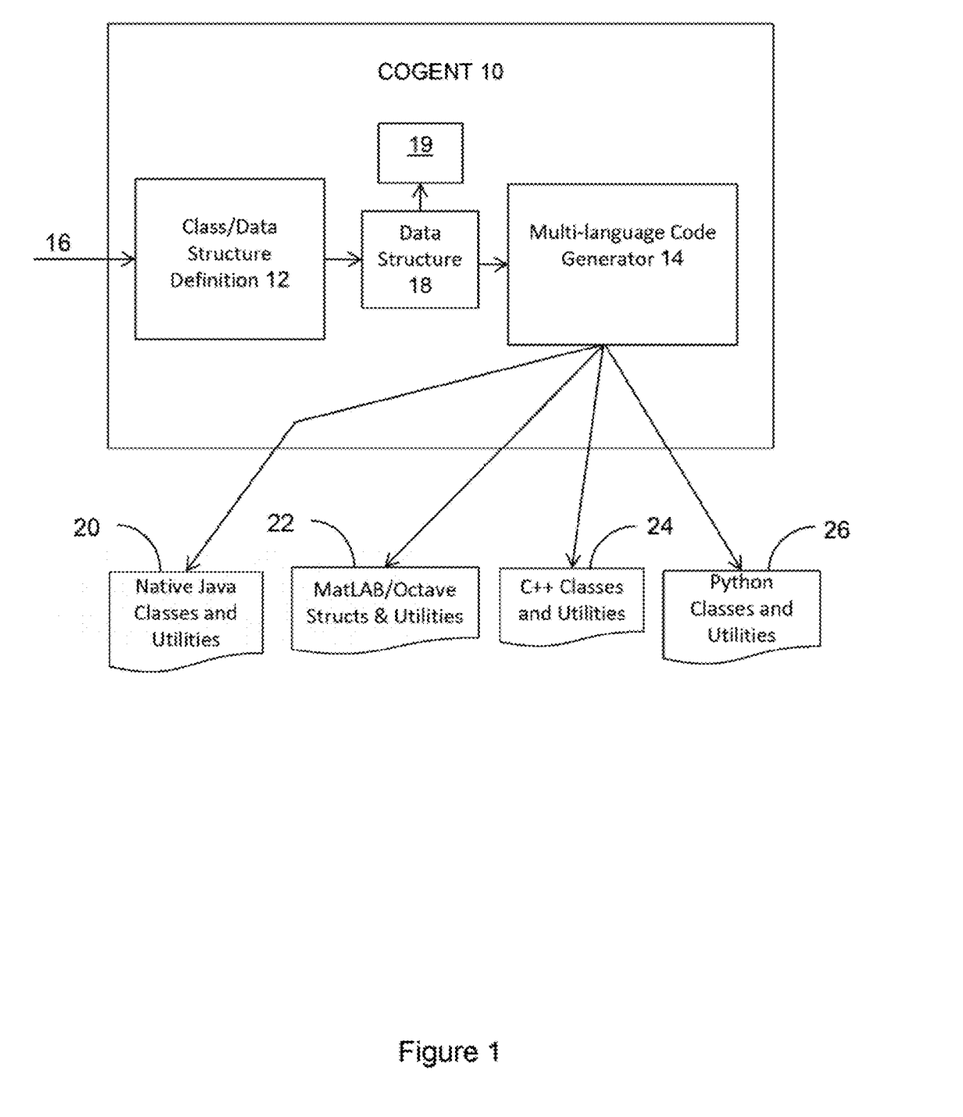
FIG. 1 illustrates one example embodiment of a Code GENeration Toolkit (COGENT).

FIG. 1 illustrates one example embodiment of a data-transfer-oriented code generator that is also referred to as "COGENT" 10 and was developed at BAE Systems, Inc. For reasons discussed below, COGENT 10 is particularly useful in systems that contain a large amount of data and have a need to transfer that data from one general-purpose software language to another. COGENT 10 allows a user to define a complex data structure one time and then to generate containers for the data structure in several different general-purpose software languages. COGENT 10 also generates classes and utilities in each of those languages for marshalling data between the different programming languages. As understood by those of ordinary skill in the art, marshalling data (also referred to as the "serialization of data") is the conversion of an in-memory representation (that is, one native to the programming language) to a format amenable for transfer over a network, storage within a file, or any other storage or transmission purpose. Marshalling data using COGENT 10 generated class/utilities currently provides transporting data at speeds of several gigabytes per second. De-marshalling is the reverse process of un-compacting data in the binary format back into a human readable format once it has reached its destination. In short, COGENT 10 generates data compatible structures/containers in multiple software languages from single data structure file input by a user and also generates their associated utilities, including marshalling/de-marshalling utilities, for each of those software languages. This allows users working with data generated in a software language they are familiar with to easily share data with others working with different software languages without the need to manually edit or otherwise alter the format of shared data once the data has been prepared by a utility created by COGENT 10.

In general, COGENT 10 is a data-transfer-oriented code generator that creates software code for several different general-purpose software languages. As illustrated in FIG. 1, COGENT 10 includes a class/data structure definition portion 12 and a multi-language code generator 14. In some configurations, the class/data structure definition portion 12 and a multi-language code generator 14 are implemented in software that may be a metalanguage such as JavaScript Object Notation (JSON), for example. However, in the configurations, the class/data structure definition portion 12 and a multi-language code generator 14 may be partially implemented in with hardware and/or other logic. "Logic", as used herein, includes but is not limited to hardware, firmware, software, and/or combinations of each to perform a function(s) or an action(s), and/or, to cause a function or action from another logic, method, and/or system. For example, based on a desired application or need, logic may include a software-controlled microprocessor, discrete logic such as an application-specific integrated circuit (ASIC), a programmed logic device, a memory device containing instructions or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

The class/data structure definition portion 12 allows a user to create inputs 16 that are used to define data structures 18 that may be very large and hierarchical. For example, the user may use a standard graphical user interface (GUI) to define and create data types and other data structures. In one configuration, data types and data structures may be saved as a data structure definition file 19 that preferably defines an entire data structure of a project or application to be simulated. In some configurations, this data structure definition file 19 may contain signed integers, unsigned integers, float values, double float values, complex float values, complex double float values, Booleans, strings, dynamic-sized ordered arrays of primitive types, code-generated types, dynamically-sized ordered arrays, associative arrays, fixed-length arrays, graphs and the like, as understood by those of ordinary skill in the art. In some configurations, the data structure definition file 19 may also contain hierarchal and/or nested arrays of data.

Figure 2A:
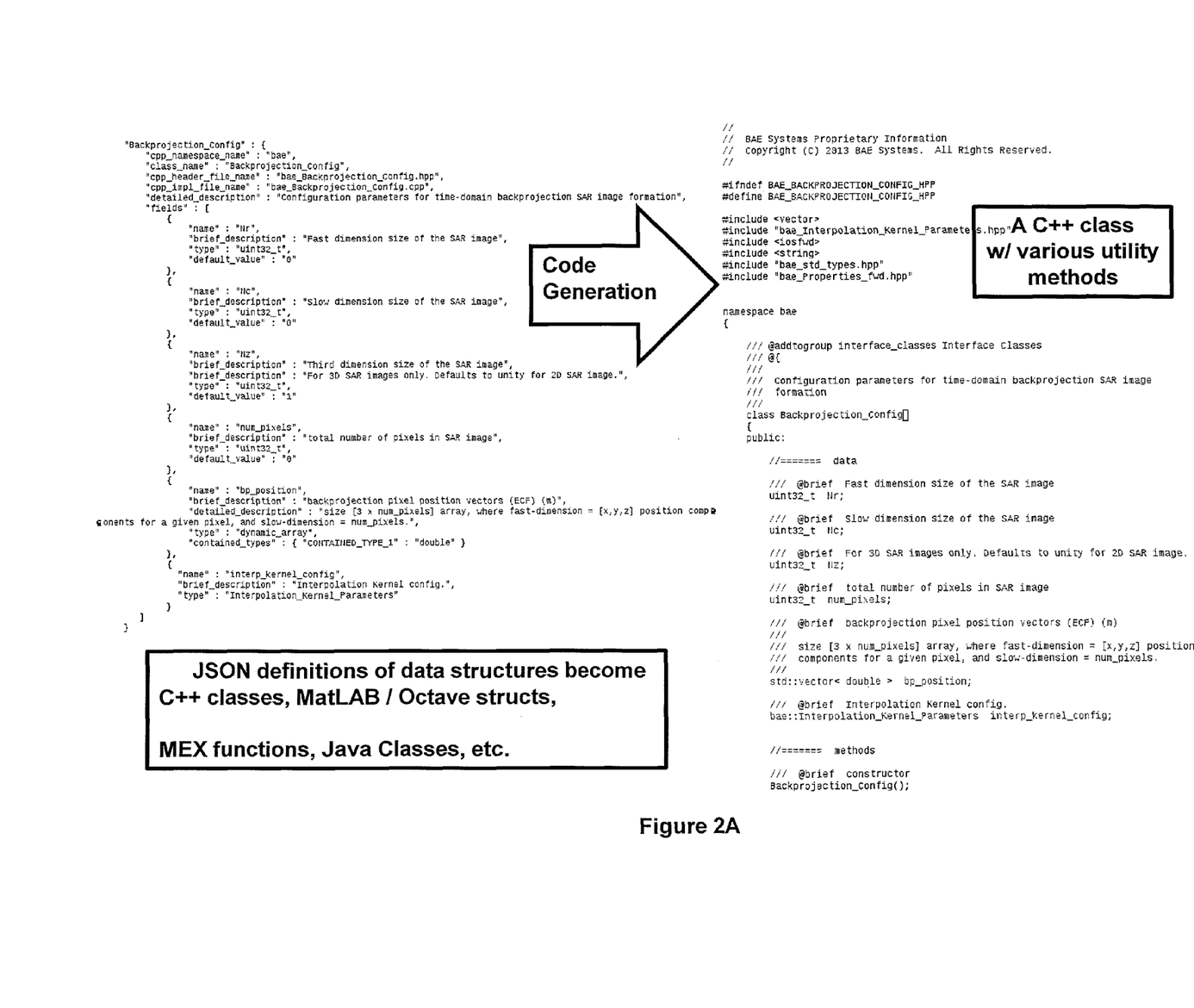
FIG. 2A illustrates an example of generating C++ classes with various utilities and methods from a JavaScript Object Notation (JSON) defined data structure.
Figure 2B:
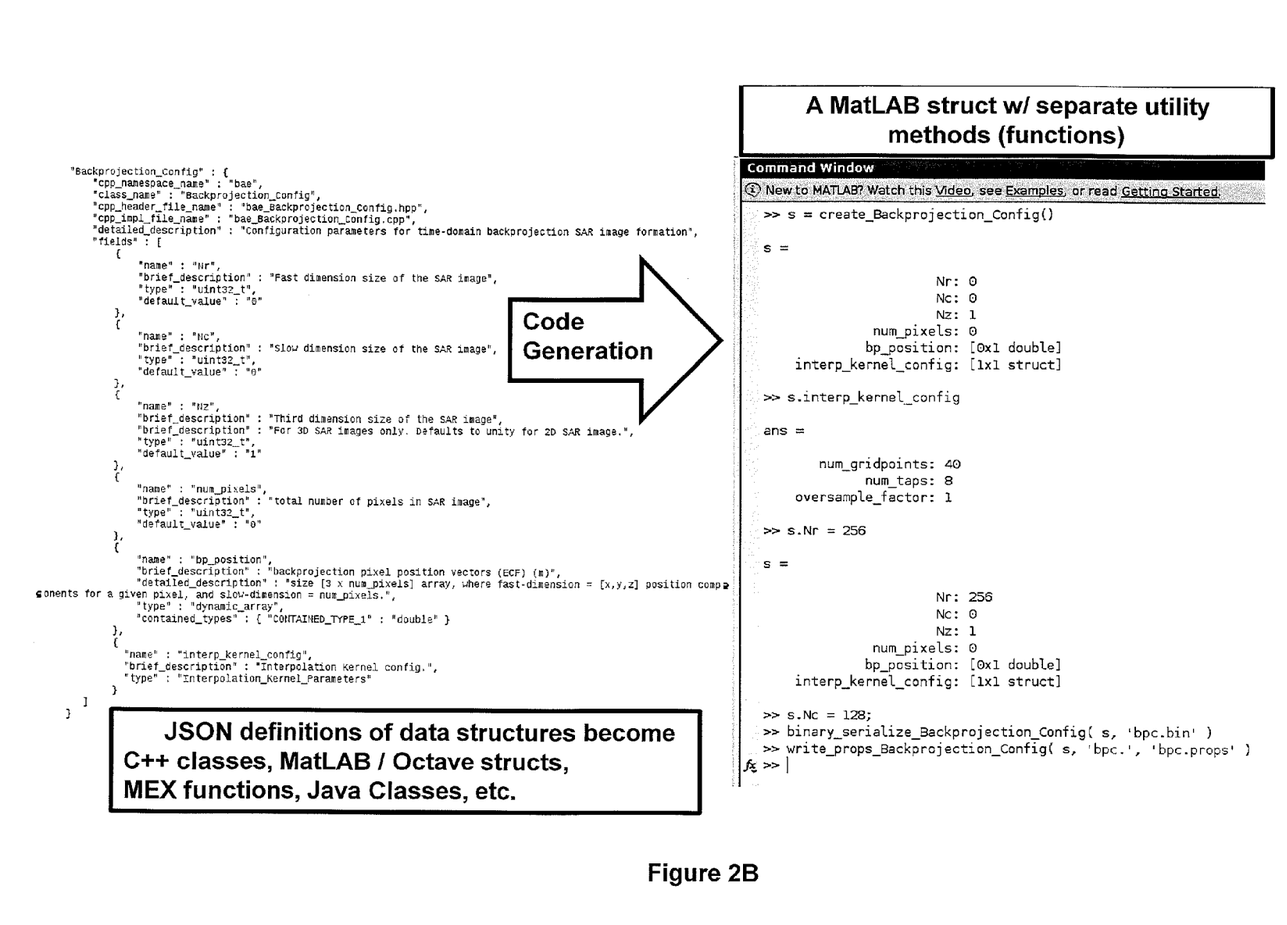
FIG. 2B illustrates an example of generating MatLAB structures with separate utility methods (functions) from the same JSON defined data structure as FIG. 2A.
Figure 2C:
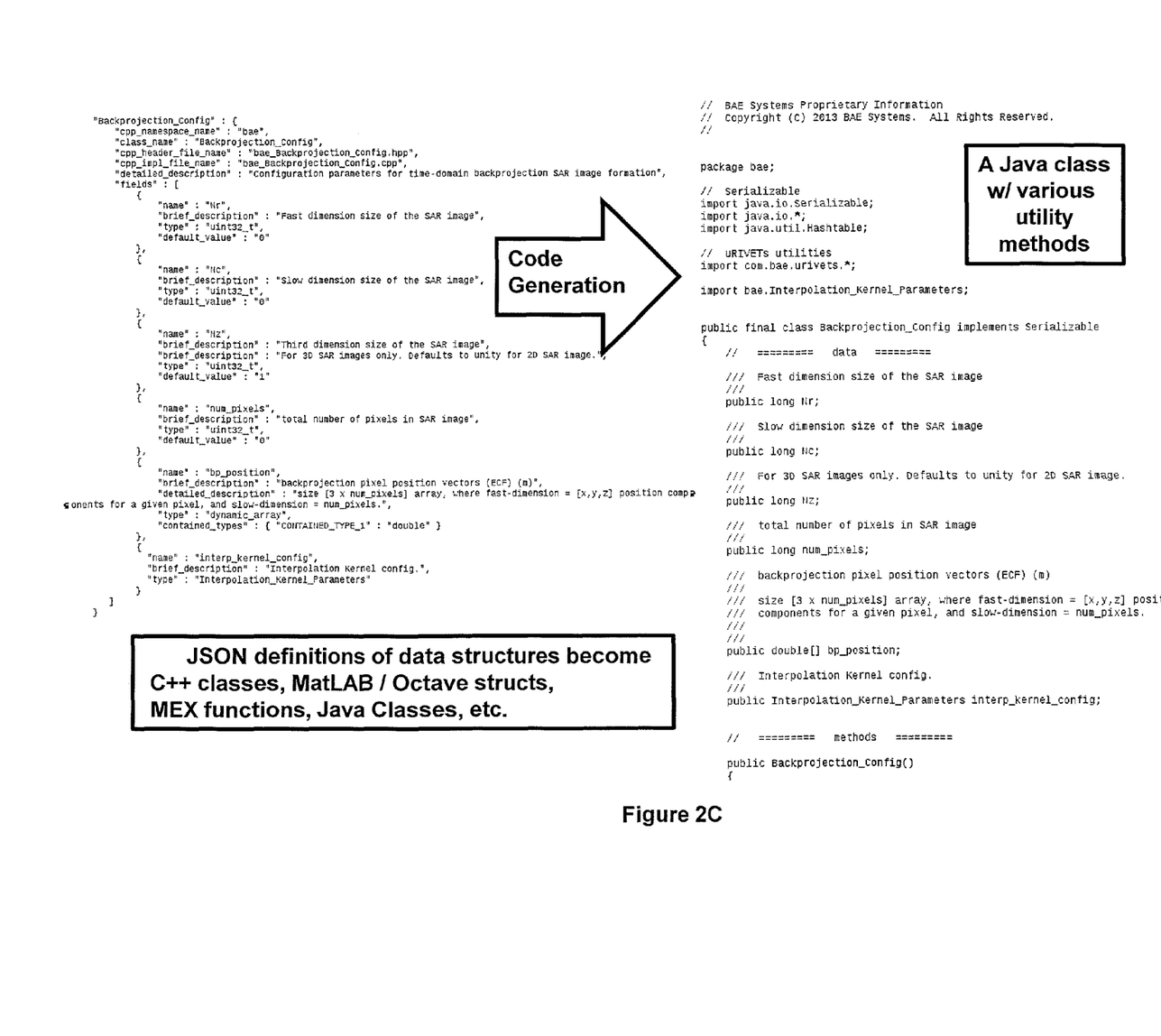
FIG. 2C illustrates an example of generating Java classes with various utility methods from the same JSON defined data structure as FIGS. 2A and 2B.

After a data structure has been created with the class/data structure portion 12, the multi-language code generator 14 uses that single data structure to create corresponding software data structures (containers) for one or more different general-purpose programming languages. The data structures and associated classes, utilities and other components are each closely associated with a general-purpose language (GPL). As illustrated, the multi-language code generator 14 may create native JAVA classes and utilities 20, MatLAB structures and utilities 22, C++ classes and utilities 24, Python classes and utilities 26, and the like. FIGS. 2A-2C illustrate an example small data structure file and some resulting code for C++, MatLAB, and Java based on that same data structure.

The multi-language code generator 14 may also use the data structure 18 or data structure file 19 created with the class/structure definition unit 12 to further generate MatLAB andor Octave structures and utilities, unit tests in C++/MatLAB/Java and the like, as well as creating automated documentation similar to doxygen. Those of ordinary skill in the art will appreciate the multi-language code generator 14 may also use the data structure 18 or the data structure file 19 to automatically generate software for virtually any software language including: containers, utilities (in concluding those used for martialing/de-marshalling data), structures, software unit tests, and the like. Thus, once a user defines a data structure 18, it may be used by the multi-language code generator 14 to generate code in any general-purpose programming language that COGENT 10 has been implemented to generate. In one embodiment, COGENT 10 may be written in a way that encourages extension. If a new output language is desired (e.g.; Ruby) or a new serialization strategy is desired (e.g.; writing data to a new file format such as XML or BSON) then this is easily accomplished with when COGENT 10 is written to be extensible.

Figure 3:
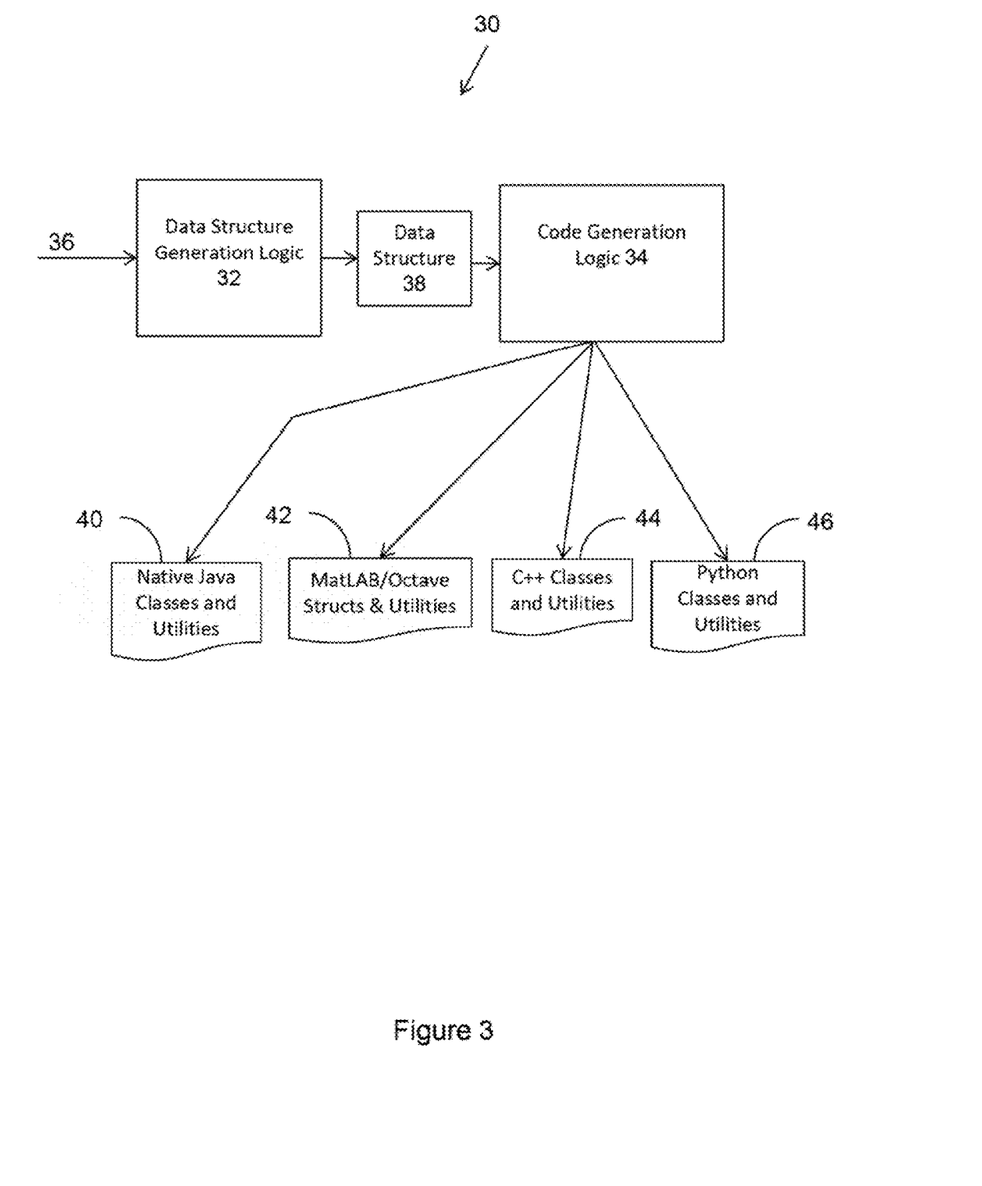
FIG. 3 illustrates another example embodiment of a system for generating data structures/containers in multiple software languages and for the generation of data transfer between containers.

FIG. 3 illustrates one configuration of a code generation system 30. The system 30 includes a data structure generation logic 32 and a code generation logic 34. The data generation logic operates similar to the class/data structure definition unit 12 described above and may be at least partially implemented in software that may be a metalanguage such as JSON. The data structure generation logic 32 receives inputs 36 from a user defining a data structure and automatically generates a representation of the data structure 38 as defined by the user.

Similar to the multi-language code generator 14 discussed earlier, the code generation logic 34 converts the data structure 38 into first software having a first container representing the data structure 38 and converts the data structure 38 into second software having a first container representing the data structure 38. The first and second software are implementations of two different. GPLs. Of course, the code generation logic 34 may convert the data structure into any number of implementations within any number of corresponding GPLs. FIG. 3 illustrates the data structure 38 being converted into Java 40, MatLAB 42, C++ 44, and Python 46. Depending on how the data structure 38 is defined, the code generation logic may define classes that also contain functions. Some functions may perform the serialization/martialing functions, perform comparisons and orderings, perform strict-weak ordering, and other utility functions.

Instead of writing containers to hold a data structure manually that are good for one language, the code generation system 30, similar to COGENT 10 mentioned above, provides a way to define a large, complex, hierarchical data structure a single time and then generates implementations corresponding to the data structure for many different general-purpose software languages. Using the code generation logic 34 to generate code from a same data structure for different software languages allows data to be passed between different languages which in turn enables different software coders working with different languages to work more collaboratively together.

One example where large amounts of data may need to be shared between many users is in the design of a complex radar system that was mentioned in the background section. COGENT 10 of FIG. 1 and the code generation system 30 of FIG. 3 both provide for easy sharing of data. A MatLAB user is able to provide a C++ user data output from MatLAB that will run on C++ that does not need reformatted or altered if they both are using MatLAB and C++ that are code created from a common data structure by COGENT 10 of FIG. 1 or the code generation system 30 of FIG. 3. This is because the MatLAB and C++ code contains marshalling utilities for marshalling/de-marshalling data into a format usable by other code without further alteration. Similarly, the C++ user may provide data from a C++ simulation that may be simulated in MatLAB code without further alteration beyond the use of the marshalling/de-marshalling utilities. Data of other code corresponding to other GPL software may be shared in this way without requiring any formatting or other conversion of the data when marshalling between different software languages as long as of both software languages have code generated using the same data structure as described above.

Because COGENT 10 of FIG. 1 and the code generation system 30 of FIG. 3 both provide marshalling functions to allow data to be easily shared, a user simulating in one software environment may output simulation data at any point in time during a simulation. This data can then be provided to another person running a similar simulation in a different second software environment to allow for the second software environment to use the data from the first software environment, without modification, to recreate the simulation of the first software environment. If data is fundamentally hierarchical, such as a tree type of data structure. COGENT 10 and/or the code generation system 30 discussed above both generate data structures and code that allows one to take any point on the tree and write out the data of the subtree from that point. For example, a high level container may contain lower level containers, and the lower level containers may contain even lower level containers beneath them and so on. Using code generated containers generated from a common database allows one to write simulation data/state out from anywhere in software code and then allows a different second software code to read that data/state and then to view the state in the second software code.

Figure 4:
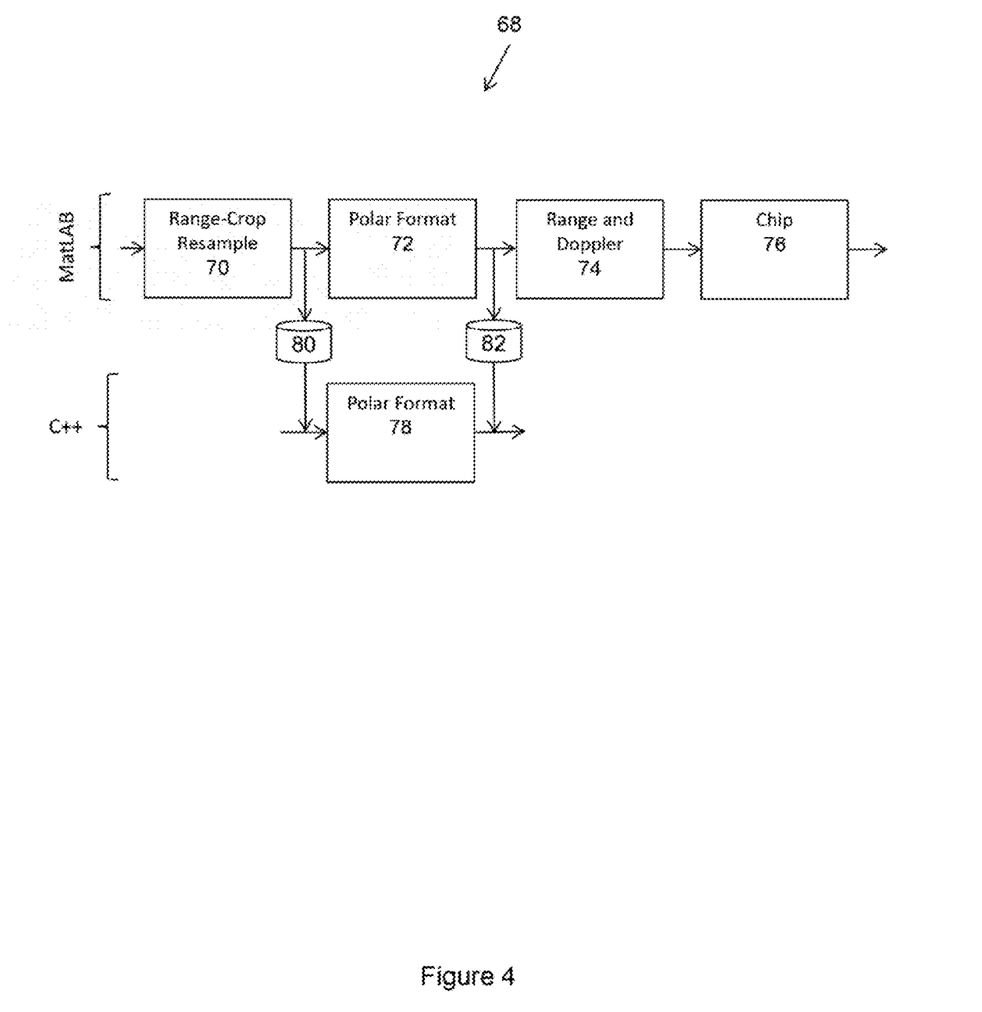
FIG. 4 illustrates sharing of data between MatLAB implemented units and C++ implemented units in an example radar design.

For example, FIG. 4 illustrates a partial software implementation of a radar system 68. In this example, four software units have been written in MatLAB that include a range-crop-resample unit 70, a polar format unit 72, a range & Doppler unit 76, and a chip unit 78. However, only one unit is of interest and has been written for simulation in C++, the polar format unit 78. A software engineer may run a simulation using all four units in MatLAB and then at some point in time write out the inputs and other internal state of the polar format unit 72 to an input file 80 and write out output data to an output file 80. As long as MatLAB units and the C++ polar format unit 78 have been generated as discussed above with COGENT 10 or by a system similar to the code generation system 30 of FIG. 3, a software engineer with no knowledge about MatLAB will be able to read the input file 80 and output file 82 and recreate the MatLAB simulation in C++ without needing to edit or transform the data of the input file 80 and the output file 82.

COGENT 10 and systems similar to the code generation system 30 make changes to configuration data easy. For example, if one wants to change a feature or parameter located in the heart of a program or one wants to add a feature, one may only need to change a single parameter at a single location deep in the code in a single file. After making that change, COGENT 10 or a system similar to the code generation system 30 would be rerun and everywhere that parameter is read, passed through, updated, written out, etc. COGENT 10 or similar system would automatically make all the appropriate changes for that changed or new parameter. This makes changes to code very easy/simple.

Example methods may be better appreciated with reference to flow diagrams. While for purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 5:
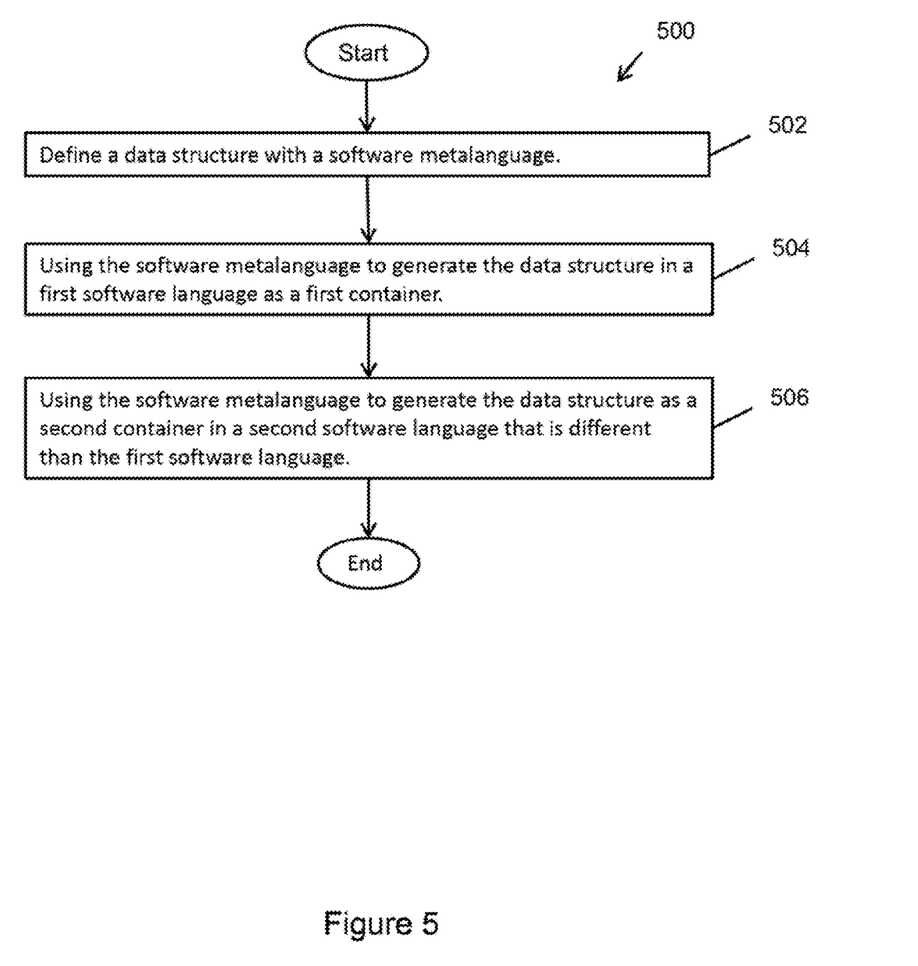
FIG. 5 illustrates an example method of creating a data structure and using that data structure to generate data structures (containers) and code for two or more different software languages.

FIG. 5 illustrates a method 500 of creating a data structure and then using that data structure to generate data structures (containers) and code for two or more different general-purpose software languages. The method 500 begins at 502 by defining a data structure. As discussed above, the data structure may be created using a metalanguage, such as JavaScript Object Notation (JSON) or another metalanguage. The software metalanguage is used at 504 to generate the data structure in a first software language as a first container and is then again used at 506 to generate the data structure in a second software language that is different than the first software language as a second container. The first software language is a first metalanguage and the second software language is a second metalanguage. The first and second metalanguages are different software languages and may be C, C++, MatLAB, Java, Python, Octave, CUDA, Octave and the like. The data containers may have multiple levels of hierarchy and may contain classes including one or more signed integers, unsigned integers, float values, double float values, complex float values, complex double float values, Booleans, strings, dynamic-sized ordered arrays of primitive types, code-generated types, dynamically-sized ordered arrays, associative arrays, fixed-length arrays, graphs and the like.

The method 500 may also, based on the defined data structure, generate utilities in the first software language and generate utilities in the second software language. The utilities may include a marshalling utility in the first software language for marshalling data from the first container in the first software language and a marshalling utility for marshalling data from the second container in the second software language. The utilities may also include complementary de-marshalling utilities for the first de-marshalling data for the first software language and for the second software language. As discussed above, the marshalled data does not need to be transformed between when the marshalled data is marshalled with the first software language and when the marshalled data is de-marshalled with the second software language and vice versa.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example" and so on indicate that the embodiment(s) or example(s) so described may include a particular feature, structure, characteristic, property, element, or limitation, but that not every embodiment or example necessarily includes that particular feature, structure, characteristic, property, element, or limitation.

What is claimed is:

1. A method comprising:
defining, by a processor, a set of user-defined data types with an encoding;
using the encoding and a code-generator utility to generate, by the processor, a first at least one class to implement each of the user-defined data types within the set of user-defined data types in a first software general-purpose language (GPL) as a first container;
using the encoding and the code-generator utility to generate, by the processor, a second at least one class to implement each of the set of user-defined data types within the set of user-defined data types in a second software GPL as a second container;
running a code-generator to generate, by the processor, software configured to marshal each of the set of user-defined data types within the set of user-defined data types in the first and second at least one classes;
marshalling, by the processor, data directly between the first software language and the second software language utilizing a Matlab executable (MEX) interface; and
de-marshalling, by the processor, the marshalled data directly into the second software language utilizing the MEX interface.

2. The method of claim 1 further comprising:
using the encoding to generate utilities in the first software language and to generate utilities in the second software language.

3. The method of claim 2 wherein the utilities further comprise:
a marshalling utility in the first software language configured to marshal data between the first container of the first software language and the second container of the second software language; and
a de-marshalling utility in the second software language configured to de-marshal data into the second software language.

4. The method of claim 3 further comprising:
using the marshalling utility and de-marshalling utility to marshal and de-marshal data from the first software language directly to the second software language.

5. The method of claim 1 further comprising:
capturing simulation data representing the state of a simulation test in the first software language at a point in time;
marshalling the simulation data directly to the second software language to create marshalled simulation data;
de-marshalling the marshalled simulation data directly into the second software language; and
viewing a state of the second software language at the point in time.

6. The method of claim 5 further comprising:
running the simulation test from the point in time in the second software language to a second different point in time.

7. The method of claim 5 wherein the marshalling further comprises:
marshalling the simulation data into a compacted binary format.

8. The method of claim 1 wherein the encoding utilizes, at least in part, JavaScript Object Notation (JSON).

9. The method of claim 1 wherein the first at least one class comprises one or more of the group of: signed integers, unsigned integers, float values, double float values, complex float values, complex double float values, Booleans, strings, dynamic-sized ordered arrays of primitive types, code-generated types, dynamically-sized ordered arrays, associative arrays, fixed-length arrays, and graphs.

10. The method of claim 1 wherein the first software GPL is one of the group of: Matlab and Octave.

11. The method of claim 1 wherein the defining a set of user-defined data types further comprises:
defining a set of user-defined data types that has multiple levels of hierarchy.

12. The method of claim 1 wherein the second software GPL is one of the group of: C, C++ and CUDA.

13. The method of claim 1, wherein a correspondence between each of the set of user-defined data types within the set of user-defined data types and the first and second at least one classes in the first software language and the second software language is 1:1.

14. A system comprising:
a processor;
a data type generation logic configured to cause the processor to allow a user to define a set of user-defined data types;
a code generation logic configured to cause the processor to generate a first at least one class to implement each of the set of user-defined data types within the set of user-defined data types in a first container of a first software general-purpose language (GPL), and wherein the code generation logic is configured to cause the processor to generate a second at least one class to implement each of the set of data types within the set of user-defined data types in a second container of a second software GPL; wherein the code generation logic is further configured to cause the processor to generate software configured to marshal each of the set of user-defined data types within the set of user-defined data types in the first and second at least one classes;
a data marshalling logic configured to cause the processor to marshal data directly between the first software language and the second software language utilizing a Matlab executable (MEX); and
a data de-marshalling logic configured to cause the processor to de-marshal the marshalled data directly into the second software language utilizing the MEX interface.

15. The system of claim 14 wherein the processor further comprises:
an encoding configured to allow the user to define at least a portion of the set of user-defined data types.

16. The system of claim 14 wherein the marshalling logic is configured to cause the processor to generate marshalling utilities in the first software language configured to be used to capture state and data values of the first software language at a point in time; and
wherein the de-marshalling logic is configured to cause the processor to generate de-marshalling utilities in the second software language configured to be used to directly marshal and de-marshal the state and data values of the first software language into the second software language allowing the second software language to be run from the point in time.

17. The system of claim 14 further wherein the set of user-defined data types has a plurality of levels of hierarchy.

18. The system of claim 14 wherein the first software GPL is one of the group of: Matlab and Octave.

19. The system of claim 14 wherein the second software GPL is one of the group of: C C++ and CUDA.

20. The system of claim 14, wherein a correspondence between each of the set of user-defined data types within the set of user-defined data types and the first and second at least one classes in the first software language and the second software language is 1:1.

* * * * *